(12) United States Patent
Kinoshita et al.

(10) Patent No.: US 12,209,386 B2
(45) Date of Patent: Jan. 28, 2025

(54) FEEDBACK CONTROL DEVICE

(71) Applicants: KOBELCO CONSTRUCTION MACHINERY CO., LTD., Hiroshima (JP); HIROSHIMA UNIVERSITY, Higashi-Hiroshima (JP)

(72) Inventors: Takuya Kinoshita, Hiroshima (JP); Toru Yamamoto, Hiroshima (JP)

(73) Assignees: KOBELCO CONSTRUCTION MACHINERY CO., LTD., Hiroshima (JP); HIROSHIMA UNIVERSITY, Higashi-Hiroshima (JP)

( * ) Notice: Subject to any disclaimer, the term of this patent is extended or adjusted under 35 U.S.C. 154(b) by 337 days.

(21) Appl. No.: 17/779,242

(22) PCT Filed: Nov. 18, 2020

(86) PCT No.: PCT/JP2020/042927
§ 371 (c)(1),
(2) Date: May 24, 2022

(87) PCT Pub. No.: WO2021/111874
PCT Pub. Date: Jun. 10, 2021

(65) Prior Publication Data
US 2022/0403621 A1 Dec. 22, 2022

(30) Foreign Application Priority Data
Dec. 5, 2019 (JP) ................. 2019-220130

(51) Int. Cl.
*E02F 9/20* (2006.01)
*E02F 3/43* (2006.01)
*G05B 11/36* (2006.01)

(52) U.S. Cl.
CPC .............. *E02F 9/2025* (2013.01); *E02F 3/43* (2013.01); *G05B 11/36* (2013.01)

(58) Field of Classification Search
CPC ... B62D 6/008; B62D 6/10; E02F 3/43; E02F 3/435; E02F 9/2012; E02F 9/2025; E02F 9/2203; G05B 7/02
See application file for complete search history.

(56) References Cited

U.S. PATENT DOCUMENTS

| 6,098,322 A | 8/2000 | Tozawa et al. |
| 2009/0105907 A1* | 4/2009 | Yamaguchi ............ B62D 5/008 701/41 |

(Continued)

FOREIGN PATENT DOCUMENTS

| EP | 0 905 325 A1 | 3/1999 |
| EP | 3 360 480 A1 | 8/2018 |

(Continued)

OTHER PUBLICATIONS

Extended European Search Report issued Dec. 9, 2022 in European Patent Application No. 20897406.3, 5 pages.

(Continued)

*Primary Examiner* — Peter D Nolan
*Assistant Examiner* — Ce Li Li
(74) *Attorney, Agent, or Firm* — Oblon, McClelland, Maier & Neustadt, L.L.P.

(57) ABSTRACT

A feedback control device determines a first target angular velocity that is a target angular velocity of an output angular velocity of the target device, using a first transfer function, determines a control input to the target device, based on a difference between the first target angular velocity and the output angular velocity, determines, based on the operation input, a second target angular velocity that is the target angular velocity requested by an operator, determines a degree of comfort of the operator, based on a difference between the output angular velocity and the second target angular velocity, sequentially accumulates the first target angular velocity, the degree of comfort, and a target degree (Continued)

of comfort in a database, and adjusts a first moment of inertia in such a way as to reduce a difference between the target degree of comfort and the degree of comfort, using data accumulated in the database.

7 Claims, 4 Drawing Sheets

(56) References Cited

U.S. PATENT DOCUMENTS

| | | | |
|---|---|---|---|
| 2013/0009761 A1 | 1/2013 | Horseman | |
| 2014/0316664 A1 | 10/2014 | Anders et al. | |
| 2015/0012186 A1 | 1/2015 | Horseman | |
| 2018/0055403 A1* | 3/2018 | Yamamoto | G05B 11/42 |
| 2018/0303370 A1 | 10/2018 | Kanayama et al. | |
| 2019/0359248 A1* | 11/2019 | Tsubaki | B62D 5/0463 |
| 2019/0359251 A1* | 11/2019 | Shimokawabe | B62D 5/0466 |
| 2020/0298904 A1* | 9/2020 | Kitazume | B62D 5/0463 |
| 2021/0206426 A1 | 7/2021 | Kitazume et al. | |
| 2021/0245800 A1* | 8/2021 | Kitazume | B62D 5/0463 |

FOREIGN PATENT DOCUMENTS

| | | |
|---|---|---|
| JP | 2012-22041 A | 2/2012 |
| JP | 2016-216909 A | 12/2016 |
| JP | 2018-36773 A | 3/2018 |
| WO | WO 2018/142650 A1 | 8/2018 |

OTHER PUBLICATIONS

International Search Report mailed on Jan. 12, 2021, in PCT/JP2020/042927 filed on Nov. 18, 2020 (2 pages).

Kinoshita, T et. al., "Design of a Data-Oriented Kansei Feedback Control System", Journal of Robotics, Networking and Artificial Life, vol. 4, No. 1, 2017, pp. 14-17.

Yamamoto, T et. al., "Design of a Data-Driven PID Controller", IEEE Transactions on Control Systems Technology, vol. 17, No. 1, 2009, pp. 29-39.

Wakitani, S et al., "Design of Nonlinear PID Control System Using FRIT Method", published in Measurement and Control, vol. 52, No. 10, 2013, 12 pages (with partial English translation).

* cited by examiner

FEEDBACK CONTROL DEVICE

TECHNICAL FIELD

The present invention relates to a feedback control device.

BACKGROUND ART

According to a survey by the cabinet office, our country is considered to be a country in which people have a low sense of happiness despite the country's high gross domestic product (GDP). In other words, there is a large gap between "material richness", which is related to the high GDP, and "spiritual richness", which is related to the sense of happiness.

One of measures for filling such a gap is an idea that an already sophisticated "object" (automobile, welfare support device, etc.) performs an operation in consideration of human sensitivity, thus improving people's spiritual richness.

While most researches on sensitivity are focused on static fields, such as product evaluation and designing, the inventors of the present invention have proposed a "sensitivity feedback control method" for dynamically controlling sensitivity (for example, Non-Patent Literature 1).

A conventional sensitivity feedback control method is applied to a cascade control system, which, upon receiving input of a desired degree of comfort, generates a target speed of a control target device by a PID controller. In this process, to deal with the nonlinearity of human sensitivity, a database-driven control method effective for a nonlinear system is used (e.g., Non-Patent Literatures 2 and 3).

However, according to the conventional "sensitivity feedback control method", a PID gain needs to be adjusted every time the target speed is changed in a person's brain. In an operation system, such as a hydraulic excavator, therefore, the target speed changes in various patterns. Besides, due to the structure of its control system, the hydraulic excavator automatically starts moving even when it is not operated by the person. To prevent this, an additional measure must be taken.

CITATION LIST

Non-Patent Literature

Non-Patent Literature 1: T. KInoshita and T. Yamamoto, "Design of a Data-Oriented Kansei Feedback Control System", Journal of Robotics, Networking and Artificial Life, Vol. 4-No. 1, 14/17 (2017)

Non-Patent Literature 2: T. Yamamoto, K. Takao and T. Yamada, "Design of a Data-Driven PID Controller", IEEE Trans on control systems Technology, Vol. 17-No. 1, 29/39 (2009)

Non-Patent Literature 3: Shin Wakitani, Yoshihirω Onishi, Toru Yamamoto, "Design of Nonlinear PID Control System Using FRIT Method", Measurement and Control, Vol. 52-No. 10, 885/891 (2013)

SUMMARY OF INVENTION

An object of the present invention is to provide a feedback control device that allows an operator to comfortably and safely operate a device.

To achieve the above object, the inventors of the present invention have devoted themselves to their study and have come up with a novel idea about a device that is at least rotationally operated by an operator. The inventors have paid attention to a moment of inertia of a transfer function and conceived an invention according to which the moment of inertia is adjusted as a parameter so as to improve a degree of comfort of the operator.

A feedback control device according to one aspect of the present disclosure includes: a target device that is at least rotationally operated by an operation input by an operator; a first target angular velocity determining unit that determines, based on the operation input, a first target angular velocity that is a target angular velocity of an output angular velocity of the target device, using a first transfer function that is a transfer function of the target device, the first transfer function being defined by a first moment of inertia representing a moment of inertia of the target device; a control unit that determines a control input to the target device, based on a difference between the first target angular velocity and the output angular velocity; a second target angular velocity determining unit that determines, based on the operation input, a second target angular velocity that is the target angular velocity requested by the operator; a degree of comfort determining unit that determines a degree of comfort of the operator, based on a difference between the output angular velocity and the second target angular velocity; and a database that sequentially accumulates the first target angular velocity, the degree of comfort, and a target degree of comfort, in which the first target angular velocity determining unit adjusts the first moment of inertia in such a way as to reduce a difference between the first target degree of comfort and the degree of comfort, using the first target angular velocity, the degree of comfort, and the target degree of comfort that are accumulated in the database.

DESCRIPTION OF EMBODIMENTS

A feedback control device according to an embodiment of the present invention will now be described with reference to the drawings. The scope of the present invention is not limited to the following embodiment, and may be changed within the scope of the technical idea of the present invention whenever necessary.

Figure 1:
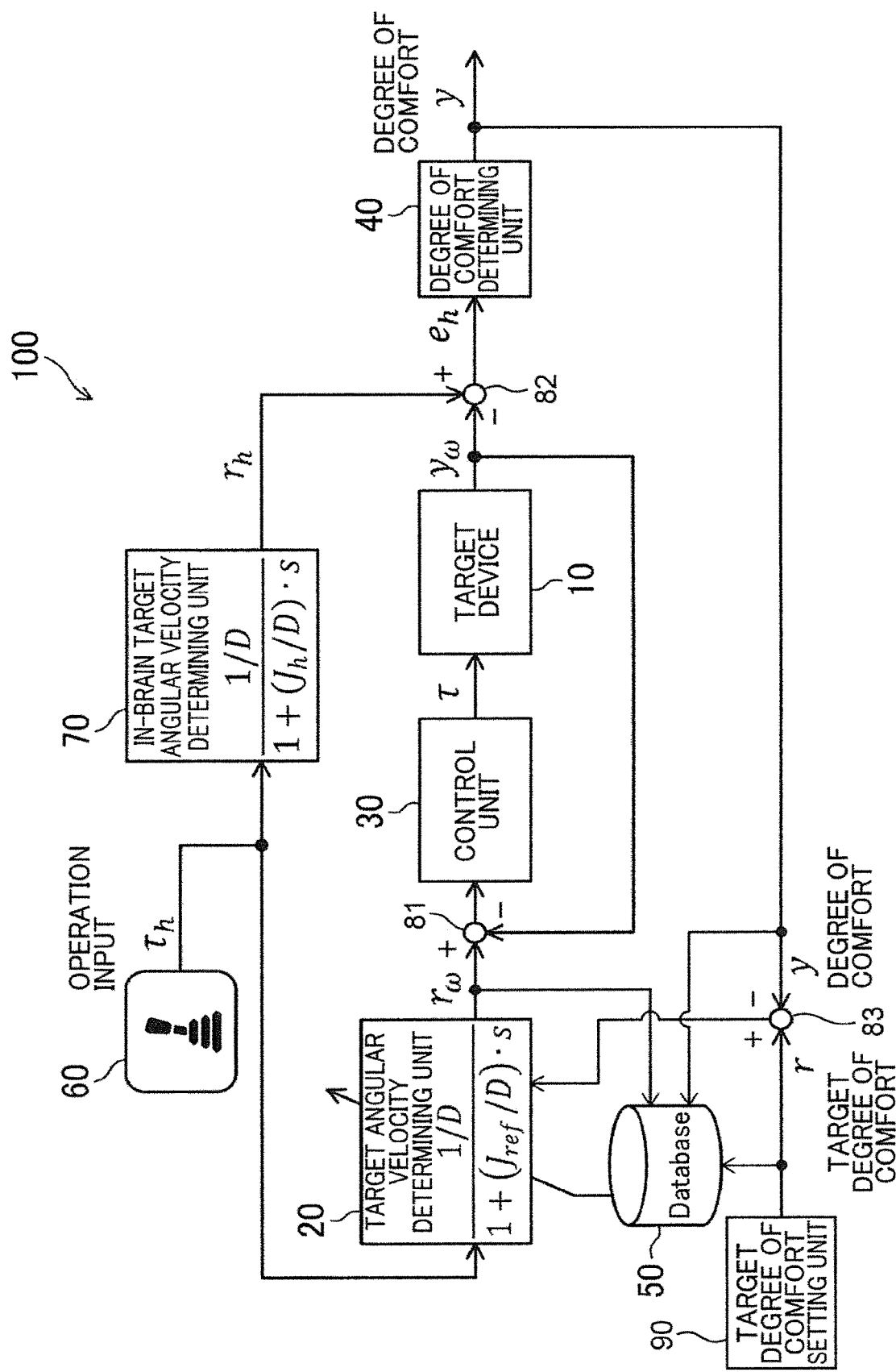
FIG. 1 is a configuration diagram of a feedback control device according to an embodiment.

FIG. 1 is a configuration diagram of a feedback control device 100 according to an embodiment. As shown in FIG. 1, the feedback control device 100 includes a target device 10, a target angular velocity determining unit 20 (first target angular velocity determining unit), a control unit 30, a degree of comfort determining unit 40, and a database 50. The feedback control device 100 further includes an in-brain target angular velocity determining unit 70 (second target angular velocity determining unit), an operation mechanism 60, subtractors 81, 82, and 83, and a target degree of comfort setting unit 90.

The target device 10 is a device that is at least rotationally operated by an operation input $\tau_h$ by an operator. The target device 10 is, for example, a rotary drive unit of an automobile, a construction machine, or the like. The rotary drive unit is, for example, a boom of a hydraulic excavator. The target device 10 operates at an output angular velocity $y\omega$ corresponding to a control input $\tau$ inputted from the control unit 30. The target device 10 inputs the output angular velocity $y\omega$ to the subtractor 82 and feeds back the output angular velocity $y\omega$ to the subtractor 81 as well.

Based on the operator's operation input $\tau_h$ to the target device 10, the target angular velocity determining unit 20 determines a target angular velocity $r\omega$ (first target angular velocity) of the output angular velocity $y\omega$ of the target device 10, using a first transfer function that is a transfer function of the target device 10. The first transfer function has a first moment of inertia representing a moment of inertia of the target device 10.

Specifically, the target angular velocity determining unit 20 adjusts the first moment of inertia as a parameter in such a way as to reduce a difference between a target degree of comfort r and a degree of comfort y, using the target degree of comfort r, the degree of comfort y, and the target angular velocity $r\omega$ that are stored in the database 50. The target angular velocity determining unit 20 inputs the operation input $\tau_h$ to the first transfer function with the first moment of inertia being adjusted, thereby determining the target angular velocity $r\omega$.

The operator's operation of the target device 10 is inputted to the operation mechanism 60. Specifically, the operation mechanism 60 includes an operation lever to which the operator's operation for driving the rotation drive unit is applied. The operation mechanism 60 inputs the inputted operation input $\tau_h$ to the target angular velocity determining unit 20 and to the in-brain target angular velocity determining unit 70.

The subtractor 81 subtracts the output angular velocity $y\omega$ from the target angular velocity $r\omega$ to calculate a difference between them, and inputs the difference to the control unit 30.

The control unit 30 determines the control input $\tau$ to the target device 10 by, for example, PID control, based on the difference between the target angular velocity $r\omega$ and the output angular velocity $y\omega$. Specifically, the control unit 30 determines the control input c by PID control in such a way as to reduce the difference inputted from the subtractor 81 to the control unit 30.

The subtractor 82 subtracts the output angular velocity $y\omega$ from the target angular velocity $r_h$ to calculate a difference $e_h$ (velocity deviation), and inputs the difference $e_h$ to the degree of comfort determining unit 40.

The degree of comfort determining unit 40 determines the degree of comfort y, based on the difference $e_h$. The degree of comfort determining unit 40 inputs the degree of comfort y to the database 50 and the subtractor 83, and outputs the degree of comfort y to an external device as well.

The subtractor 83 calculates a difference between the target degree of comfort r and the degree of comfort y, and inputs the difference to the target angular velocity determining unit 20.

The database 50 sequentially accumulates the target angular velocity $r\omega$, the degree of comfort y, and the target degree of comfort r of the degree of comfort y.

The target degree of comfort setting unit 90 sets the target degree of comfort r, and inputs the set target degree of comfort r to the database 50 and to the subtractor 83. For example, a preset value is adopted as the target degree of comfort r.

In the feedback control device 100 of this embodiment, respective functions of the target angular velocity determining unit 20, the control unit 30, the degree of comfort determining unit 40, the in-brain target angular velocity determining unit 70, and the target degree of comfort setting unit 90 are implemented by a computer's executing a program. The computer includes main hardware components, such as a processor that operates according to a program and a memory that stores data necessary for executing the program.

Furthermore, in the feedback control device 100 of this embodiment, the database 50 includes a computer-readable recording medium, such as a ROM, an optical disk, and a hard disk drive.

One of the features of the feedback control device 100 of this embodiment is that the target angular velocity determining unit 20 determines the target angular velocity $r\omega$ while adjusting the first moment of inertia as a parameter in such a way as to reduce the difference between the target degree of comfort r and the degree of comfort y, using the target degree of comfort r, the degree of comfort y, and the target angular velocity $r\omega$ that are stored in the database 50. A method of adjusting the first moment of inertia will be described in detail in examples that will be described later.

The first transfer function is expressed as, for example, $(1/D)/(1+(J/D)\cdot s)$, where J denotes the first moment of inertia and D denotes a viscosity coefficient. In this case, $1/D$ denotes a system gain. For example, a steady angular velocity that results when the boom of the hydraulic excavator is operated by full-range lever shifting can be measured easily. Based on this fact, the target angular velocity determining unit 20 may determine the target angular velocity $r\omega$, with the viscosity coefficient D given as a known fixed value. Alternatively, the target angular velocity determining unit 20 may determine the target angular velocity $r\omega$ while adjusting the viscosity coefficient D as well as the first moment of inertia J as a parameter.

In the present invention, the first moment of inertia of the target device 10 is referred to as "J", and the first moment of inertia adjusted as a parameter by the target angular velocity determining unit 20 is referred to as "$J_{ref}$".

The degree of comfort determining unit 40, for example, may acquire a biological reaction, such as heartbeat, of the operator by a sensor or the like, and determine the degree of comfort y of the operator, based on the biological reaction. Alternatively, the degree of comfort determining unit 40 may determine the degree of comfort y preferable to the operator, using a degree of comfort that the operator has entered by himself or herself using an input device, such as a touch panel.

Based on the operation input $\tau_h$ requested by the operator, the in-brain target angular velocity determining unit 70 determines a target angular velocity $r_h$ (second target angular velocity) that is a target angular velocity corresponding to the operation input $\tau_h$. The target angular velocity $r_h$ is, for example, the target angular velocity (desired angular velocity) that corresponds to operation input $\tau_h$ in the operator's brain, the operation input $\tau_h$ being made by the operator himself or herself. The difference $e_h$ between the target angular velocity $r_h$ and the output angular velocity $y\omega$ is a factor that determines the degree of comfort y of the operator. For example, when the difference $e_h$ between the target angular velocity $r_h$ and the output angular velocity $y\omega$ is 0, the degree of comfort y takes a highest value. The difference $e_h$ being 0 means that the operator has actually been able to operate the target device 10 so as to obtain the output angular velocity $y\omega$ that matches the target angular velocity $r_h$. In a practical operation of the feedback control device 100, the values of both target angular velocity $r_h$ and difference $e_h$ are unknown. The in-brain target angular velocity determining unit 70 inputs the operation input $\tau_h$ to a second transfer function to calculate the target angular velocity $r_h$.

The second transfer function is expressed, for example, as $(1/D)/(1+(J_h/D)\cdot s)$, where $J_h$ denotes a second moment of inertia representing a moment of inertia of the target device 10 that is requested by the operator and D denotes the viscosity coefficient. The value of the second moment of inertia $J_h$ is unknown.

The above-described feedback control device 100 of this embodiment includes the target angular velocity determining unit 20 that determines the target angular velocity $r\omega$ of the output angular velocity $y\omega$ of the target device 10, based on the operation input $\tau_h$ to the target device 10, and the control unit 30 that determines the control input $\tau$ to the target device 10, based on the difference between the target angular velocity $r\omega$ and the output angular velocity $y\omega$. The feedback control device 100 further includes the in-brain target angular velocity determining unit 70 that determines the target angular velocity $r_h$ that is the target angular velocity requested by the operator, based on the operation input $\tau_h$ and the degree of comfort determining unit 40 that determines the degree of comfort y of the operator, based on the difference $e_h$ between the output angular velocity $y\omega$ and the target angular velocity $r_h$. The target angular velocity determining unit 20 determines the target angular velocity $r\omega$ while adjusting the first moment of inertia $J_{ref}$ as a parameter in such a way as to reduce the difference between the target degree of comfort r and the degree of comfort y.

The degree of comfort is determined based on the difference $e_h$ between the target angular velocity $r_h$ and the output angular velocity $y\omega$. The degree of comfort determining unit 40 is thus able to determine the degree of comfort so that the degree of comfort takes the highest value when the operator has successfully carried out an operation that makes the target angular velocity of the target device, the target angular velocity being requested by the operator, equal to the actual target angular velocity of the target device. Hence the operator is able to operate the target device 10 comfortably.

According to the feedback control device 100 of this embodiment, only when the operation input $\tau_h$ is inputted by the operator to the target device 10, the target angular velocity $r\omega$ is determined, the control input c to the target device 10 is determined, and the target device 10 is operated. This prevents a case where the target device 10 starts moving automatically when the operator does not operate the target device 10, thus ensuring safety.

As described above, according to this embodiment, the feedback control device 100 that allows the operator to comfortably and safely operate a device is provided.

According to the feedback control device 100 of this embodiment, when the first moment of inertia is denoted by $J_{ref}$ and the viscosity coefficient is denoted by D, the first transfer function is expressed as $(1/D)/(1+(J_{ref}/D)\cdot s)$.

Based on this first transfer function, the feedback control device 100 can accurately feedback-control the rotation movement of the target device 10. In this case, the target angular velocity determining unit 20 may determine the target angular velocity $r\omega$, with the viscosity coefficient D given as a known fixed value.

This reduces parameters to be adjusted to the first moment of inertia $J_{ref}$ alone, thus allowing one-parameter tuning. The target angular velocity determining unit 20 may determine the target angular velocity $r\omega$ while adjusting the viscosity coefficient D as well as the first moment of inertia $J_{ref}$ as a parameter. In this case, the feedback control device 100 can feedback-control the rotation movement of the target device 10 more accurately while taking into consideration the temperature dependency of the viscosity coefficient D or the like.

In the feedback control device 100 of this embodiment, the target device 10 may be a boom of a hydraulic excavator.

In this case, the operator is allowed to operate the boom of the hydraulic excavator comfortably and safely.

In the feedback control device 100 of this embodiment, the in-brain target angular velocity determining unit 70 has the second transfer function that determines the target angular velocity $r_h$ corresponding to the operation input $\tau_h$. The second transfer function is expressed as $(1/D)/(1+(J_h/D)\cdot s)$, where $J_h$ denotes the second moment of inertia and D denotes the viscosity coefficient. The in-brain target angular velocity determining unit 70 sets the second moment of inertia $J_h$ using the adjusted value of the first moment of inertia $J_{ref}$.

In this case, the second moment of inertia $J_h$, which is unknown, can be determined using the first moment of inertia $J_{ref}$.

EXAMPLE

An example (simulation example) of the feedback control device 100 shown in FIG. 1 will hereinafter be described. In this example, the target device 10 is the boom of the hydraulic excavator, and the degree of comfort y in boom operation by the operator can be measured. The "target degree of comfort r" is given as the target value of the degree of comfort y, and the output angular velocity $y\omega$ of the boom of the hydraulic excavator is controlled so that the degree of comfort y meets the target value, i.e., "target degree of comfort r".

An object of this example is to improve a degree of comfort y (t) (t denotes time). It is not easy to directly set a proper target angular velocity $r\omega$ (t) of the target device 10 (the boom of the hydraulic excavator) at each point of time. The proper target angular velocity $r\omega$ (t) is thus automatically generated at each point of time from a relationship between the operation input (lever input torque in this example) $\tau_h$ (t) and the first moment of inertia $J_{ref}$, as indicated by the following formula (1).

[Mathematical formula 1]

$$r_\omega(t) = \frac{1/D}{1 + (J_{ref}/D) \cdot s} \tau_h(t) \quad (1)$$

In formula (1), $J_{ref}$ denotes the first moment of inertia which is targeted at by a closed-loop transfer function including the boom of the hydraulic excavator, and D denotes the viscosity resistance. In formula (1), 1/D denotes the system gain. Because the steady angular velocity that results when the boom of the hydraulic excavator is operated by full-range lever shifting can be measured easily, the viscosity coefficient D is treated as a known fixed value in this example.

In this example, the first moment of inertia $J_{ref}$ is adjusted based on a database-driven approach, which will be described later, so as to improve the degree of comfort y. Now the second moment of inertia in the operator's brain, the second moment of inertia being requested by the operator, is defined as $J_h$. When the first moment of inertia $J_{ref}$ becomes equal to the second moment of inertia $J_h$, the moment of inertia of the actual control system matches the moment of inertia in the brain. A state in which the first moment of inertia $J_{ref}$ is equal to the second moment of inertia $J_h$ is, therefore, the most comfortable state. In other words, the degree of comfort y takes the value indicating the most comfortable state when the operator has successfully carried out the same operation as the operation that achieves a target response velocity of the hydraulic excavator, the target response velocity being in the operator's brain as a requested response velocity.

In this example, the degree of comfort y (t) to be controlled is a discrete time nonlinear system expressed by the following formula (2).

[Mathematical formula 2]

$$y(t) = f(\phi(t-1)) \tag{2}$$

In formula (2), y (t) denotes a system output. f ( ) denotes a nonlinear function. $\phi(t-1)$ denotes an information vector representing a state of the system before time t. The information vector $\phi$ (t−1) is defined by the following formula (3).

[Mathematical formula 3]

$$\phi(t-1) := [y(t-1), \ldots, y(t-n_y), r_\omega(t-1), \ldots, r_\omega(t-n_w)] \tag{3}$$

In formula (3), $r\omega$ (t) (the target angular velocity of the target device 10) denotes a system input in control of the degree of comfort y (t). $n_y$ denotes the order of a system output. $n_w$ denotes the order of a system input. In database-driven control, each piece of operational data is accumulated in the database 50 (see FIG. 1) in the form of data expressed by formula (3). In addition, an information vector $\phi$ (t) representing the current state of the system is referred to as a request point (query).

Hereinafter, adjustment of the first moment of inertia $J_{ref}$ by database-driven control carried out by the target angular velocity determining unit 20 using the data accumulated in the database 50 will be described in detail.

<Creating Initial Database>

In database-driven control, when past accumulated data is not present, the first moment of inertia $J_{ref}$ cannot in principle be adjusted. In this case, therefore, input/output data is acquired using the initial first moment of inertia $J_{ref}$, and an initial database (a part of the database 50) made up of information vectors 4 expressed by the following formula (4) is created.

[Mathematical formula 4]

$$\phi(j) := [\bar{\phi}(j), J_{ref}(j)] \tag{4}$$

In formula (4), j=1, 2, . . . , N(0), and $-\phi$ (j) is given by the following formula (5).

[Mathematical formula 5]

$$\bar{\phi}(t) := [r(t+1), r(t), y(t), \ldots, y(t-n_y+1), r_\omega(t-1), \ldots, r_\omega(t-n_w+1)] \tag{5}$$

N(0) denotes the number of initial data (the number of information vectors making up the initial database). Because the first moment of inertia $J_{ref}$ estimated in the initial database is fixed, $J_{ref}(1) = J_{ref}(2) = \ldots = J_{ref}(N(0))$ holds.

<Calculating Distance and Selecting Neighborhood>

The distance between the request point $-\phi$ (t) and the information vector $-\phi$ (j) stored in the database is determined as a weighted L norm expressed by the following formula (6).

[Mathematical formula 6]

$$d(\bar{\phi}(t), \bar{\phi}(j)) = \sum_{l=1}^{n_y+n_w+1} \left| \frac{(\bar{\phi}_l(t) - \bar{\phi}_l(j))}{\max \bar{\phi}_l(m) - \min \bar{\phi}_l(m)} \right| \tag{6}$$

In formula (6), j=1, 2, . . . , N (t), and N (t) denotes the number of data (information vectors) stored in the database at time t. $-\phi$ (j) denotes the l-th element of the j-th information vector. Similarly, $-\phi$ (t) represents the l-th element of the request point at time t. Further, max$-\phi$ (m) denotes the largest element among the l-th elements of all information vectors ($-\phi$ (j): j=1, 2, . . . , N (t)) present in the database, and min$-\phi$ (m) denotes the smallest element among the l-th elements.

In this example, k information vectors are selected in the order in which the distance d obtained by formula (6) is smaller, and a set of selected data is defined as a neighborhood.

<Configuration of Local Controller>

Next, for the neighborhood defined in the above manner, a local controller is configured by a linearly weighted average (LWA) method expressed by the following formula (7).

[Mathematical formula 7]

$$J_{ref}^{old}(t) = \sum_{i=1}^{k} w_i J_{ref}(i), \quad \sum_{i=1}^{k} w_i = 1 \tag{7}$$

In formula (7), wi denotes a weight for $J_{ref}$ (i) included in the selected i-th information vector and is given by the following formula (8).

[Mathematical formula 8]

$$w_i = \sum_{l=1}^{n_y+n_w+1} \left( 1 - \frac{[\bar{\phi}_l(t) - \bar{\phi}_l(i)]^2}{[\max(\bar{\phi}_l(m) - \min \bar{\phi}_l(m)]^2} \right) \tag{8}$$

Through the above procedure, a first moment of inertia $J_{refold}$ (t) at each time t can be calculated. Now, to allow proper adjustment of the first moment of inertia $J_{ref}$ by the database-driven approach, letting the database 50 learn improved data is necessary. In this example, $J_{ref}$ in each data set in the database 50 is updated by a steepest descent method.

<Updating First Moment of Inertia $J_{ref}$ by Steepest Descent Method>

In this example, the first moment of inertia $J_{ref}$ is adjusted, using the following equation (9) representing the steepest descent method.

[Mathematical formula 9]

$$J_{ref}^{new}(t) = J_{ref}^{old}(t) - \eta \frac{\partial I(t+1)}{\partial J_{ref}(t)} \quad (9)$$

In formula (9), η denotes a learning coefficient, and I (t) denotes an evaluation standard defined by the following formulae (10) and (11).

[Mathematical formula 10]

$$I(t) := \frac{1}{2}\varepsilon(t)^2 \quad (10)$$

[Mathematical formula 11]

$$\varepsilon(t) := r(t) - y(t) \quad (11)$$

A partial differentiation in the second term on the right side of formula (9) is expanded in a manner as shown in formula (12).

[Mathematical formula 12]

$$\frac{\partial I(t+1)}{\partial J_{ref}(t)} = \frac{\partial I(t+1)}{\partial \varepsilon(t+1)} \frac{\partial \varepsilon(t+1)}{\partial y(t+1)} \frac{\partial y(t+1)}{\partial r_\omega(t)} \frac{\partial r_\omega(t)}{\partial J_{ref}(t)} \quad (12)$$

The steepest descent method is repeatedly executed until the evaluation norm defined formulas (10) and (11) becomes sufficiently small. By this approach, the optimum first moment of inertia $J_{ref}$ can be calculated, that is, the first moment of inertia $J_{ref}$ can be calculated so as to cause the first moment of inertia $J_{ref}$ to approach the second moment of inertia $J_h$ in the operator's brain.

In this example, a human sensitivity model is set based on the Weber-Fechner's law (I. P. Herman: Physics of the Human Body: Biological and Medical Physics, Biomedical Engineering, Springer-Verlag GmbH & CO. KG (2007)). This law is an expanded version of the Weber's law, and is a law derived from a hypothesis that a sense amount F and a stimulus amount R have a correlation expressed by a logarithmic function given as the following formula (13) containing a constant k.

[Mathematical formula 13]

$$F = k \log R \quad (13)$$

The Weber-Fechner's law corresponds to an intuitive fact that the intensity of sensation changes rapidly in response to an initial stimulus but a rate of increase of sensation drops gradually as the intensity of stimulus increases (Eitaro Masuyama: "Sensory tests viewed from the standpoint of psychology", Sensory tests and psychology, Vol. 22-No. 3, 107/114 (1986)). For example, in an experiment in which a person lifts a 100 g weight, the way the person feels the weight differs greatly between a case of lifting the weight from a state of already holding a 1 kg weight and a case of lighting the weight in a state of holding nothing. In this manner, it is confirmed that the way the person senses the weight gets duller as the weight increases. Specific formulae involved in a human sensitivity model will be described in the following numerical value example.

(Numerical Value Example)

A numerical value example of feedback control according to the above-described example will hereinafter be described.

It is assumed in the feedback control device 100 shown in FIG. 1 that the target device 10 operated by the operator is the boom of the hydraulic excavator and is given as a first-order lag system expressed by the following formula (14).

[Mathematical formula 14]

$$G(s) = \frac{1}{1+10s} \quad (14)$$

Meanwhile, the degree of comfort y (t) is expressed by the following formulae (15) and (16), using Weber-Fechner's law, so that the maximum value of the degree of comfort y (t) is 1.

[Mathematical formula 15]

$$y(t) = \frac{1}{1 + E(t) \cdot \log(1 + e_h(t))} \quad (15)$$

[Mathematical formula 16]

$$e_h(t) = r_h(t) - y_\omega(t) \quad (16)$$

In formulae (15) and (16), $r_h$ (t) denotes a target angular velocity of the boom of the hydraulic excavator, the target angular velocity being held in the operator's brain, and is calculated using the following formula (17).

[Mathematical formula 17]

$$r_h(t) = \frac{1/D}{1 + (J_h/D) \cdot s} \tau_h(t) \quad (17)$$

In formula (17), $J_h$ denotes a second moment of inertia of the boom of the hydraulic excavator, the second moment of inertia being held in the operator's brain, and is unknown in this numerical value example. $e_h$ (t) is a velocity error of the boom of the hydraulic excavator(a difference between the target angular velocity $r_h$ and the output angular velocity yω), the velocity error being sensed by the operator's brain.

Figure 2:
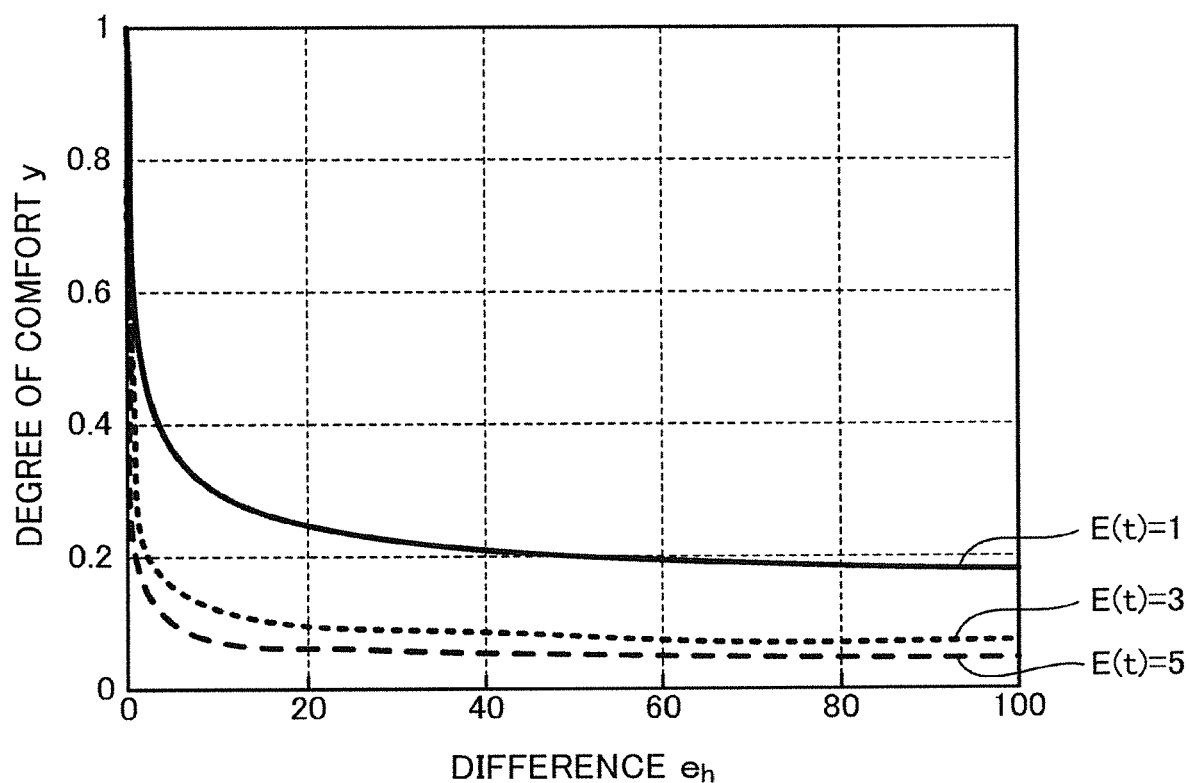
FIG. 2 depicts a relationship between a degree of comfort and an output error in the feedback control device according to the embodiment.

It follows from formula (15) that the difference $e_h$, (t) in the operator's brain is 0, the degree of comfort y (t) is 1, which is the maximum degree of comfort. It should be noted that E (t) is a variable that varies with respect to the degree of comfort y (t), and takes different values for different operators. E (t) for each operator may be determined based on the biological response of a biological sensor, or may be determined based on the degree of comfort y inputted by the operator. FIG. 2 is a graph showing a relationship between the difference $e_h$ (t) in the operator's brain and the degree of comfort y (t). As shown in FIG. 2, the degree of comfort y (t) decreases as the difference $e_h$(t) increases. In addition, the rate of decrease of the degree of comfort y (t) increases as E (t) increases.

It should be noted that setting parameters in numerical expressions shown below are given values such that r (t)=1.0 (fixed to the maximum value 1 of the degree of comfort y (t)), η=0.8, E (t)=1, and D=1.

In this numerical value example, it is assumed that the boom of the hydraulic excavator is operated to move vertically. In such a vertical movement, due to gravity, the velocity of the boom in descending movement gets higher than the velocity of the boom in ascending movement. It is therefore assumed that the operator puts the above fact in the operator's brain as a pre-conceived image. A case is assumed where the second moment of inertia $J_h$ (t) changes depending on a given operation input (lever input torque) $\tau_h$ (t), the case being expressed as the following formula (18). Under this assumption, the followability of the first moment of inertia $J_{ref}(t)$ to the second moment of inertia $J_h$ (t) has been checked, the first moment of inertia $J_{ref}(t)$ being obtained by the adjustment method described in the example.

[Mathematical formula 18]

$$J_h(t) = \begin{cases} 50 & (\tau_h(t) = 0.5) \\ 5 & (\tau_h(t) = -0.5) \end{cases} \quad (18)$$

Input/output to/from the control unit 30 is subjected to, for example, PID control using $K_P$, $K_I$, and $K_D$ as PID parameters, the PID control being expressed by the following formula (19).

[Mathematical formula 19]

$$\tau(t) = K_P \varepsilon(t) + K_I \int_0^t \varepsilon(T)dT + K_D \frac{d\varepsilon(t)}{dt} \quad (19)$$

$\varepsilon$ (t) in formula (19) denotes a difference between the target angular velocity $r\omega$ (t) and the output angular velocity $y\omega$ (t), as shown in the following formula (20).

[Mathematical formula 20]

$$\varepsilon(t) = r_\omega(t) - y_\omega(t) \quad (20)$$

As the PID parameter for the control unit 30, existing parameters corresponding to the target device 10 can be used. The existing parameters may be fixed constants or variable parameters. In this numerical value example, PID parameters $K_P=10$, $K_I=0.5$, and $K_D=0$ are used.

Figure 3:
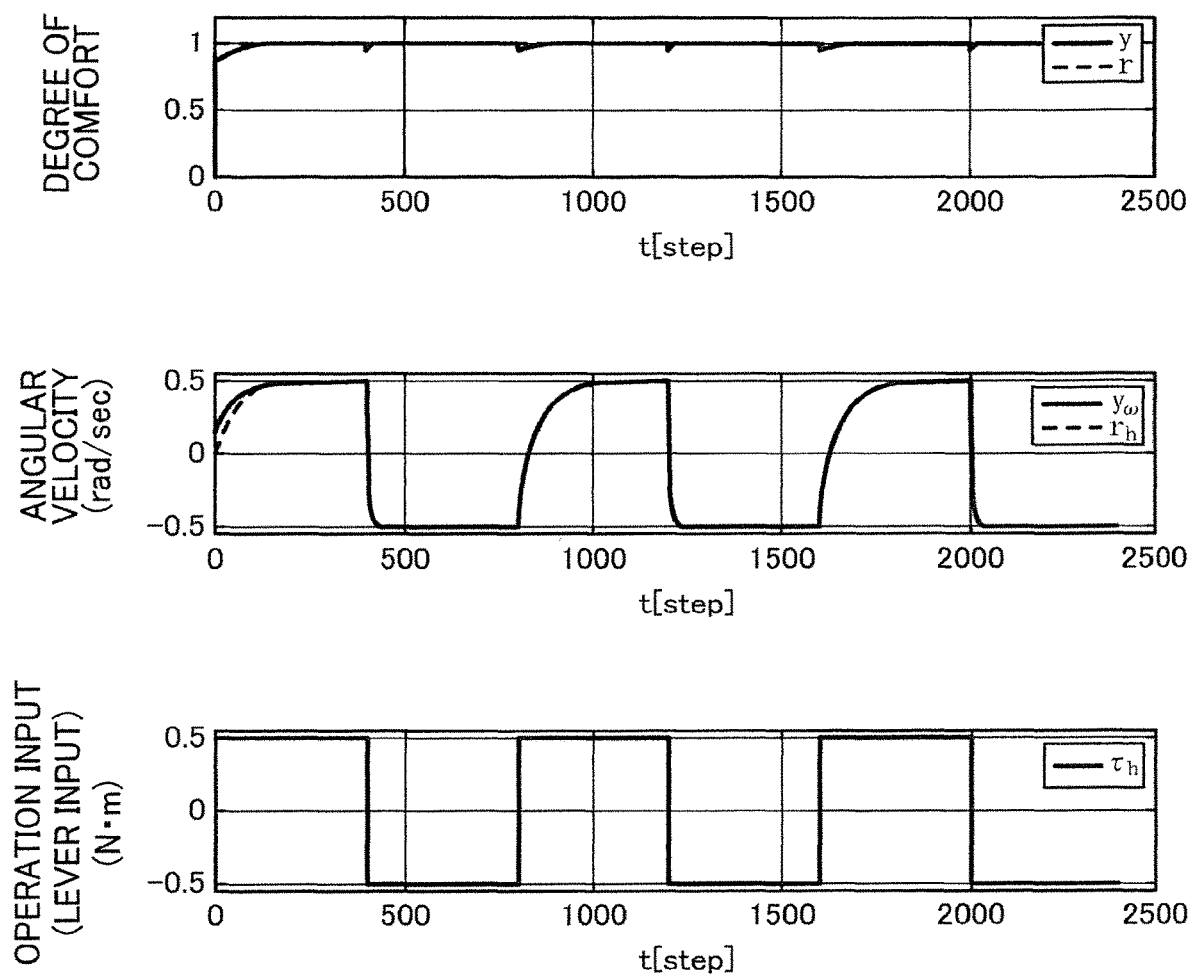
FIG. 3 depicts a result of simulation of time-dependent changes in a degree of comfort, an output angular velocity, and an operation input, the time-dependent changes occurring in feedback control using the feedback control device according to the embodiment.
Figure 4:
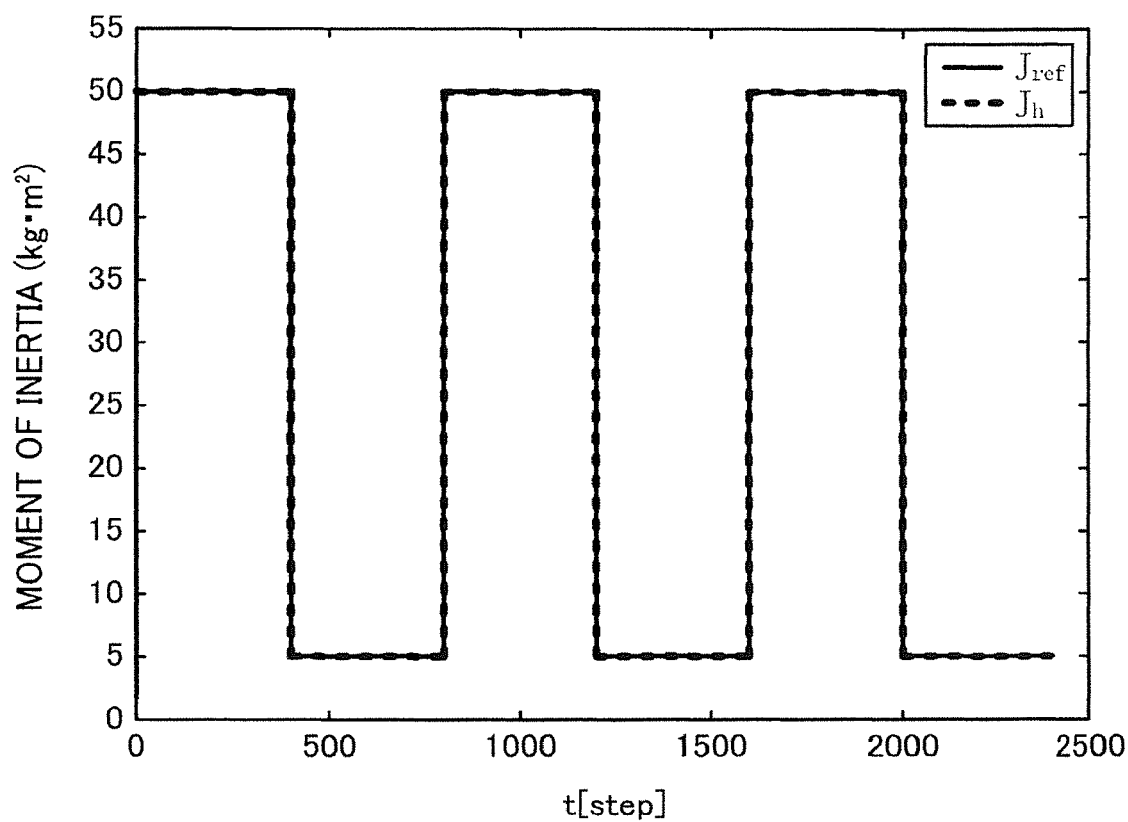
FIG. 4 depicts a state of a moment of inertia being adjusted in feedback control using the feedback control device according to the embodiment.

With the above setting, a simulation of time-dependent changes in the degree of comfort y (t), the output angular velocity $y\omega$ (t), and the operation input (lever input) $\tau_h$ (t) has been executed as the first moment of inertia $J_{ref}$ (t) is adjusted by the database-driven control. FIG. 3 shows a simulation result. In FIG. 3, a graph on the top is a graph showing time-dependent changes in the degree of comfort y (t) and the target degree of comfort r (t). In this graph on the top, a continuous line represents the degree of comfort y (t) and a dotted line represents the target degree of comfort r (t). In FIG. 3, a graph in the middle is a graph showing time-dependent changes in the output angular velocity $y\omega$ (t) and the target angular velocity $r_h$ (t). In this graph in the middle, a continuous line represents the output angular velocity $y\omega$ (t) and a dotted line represents the target angular velocity $r_h$ (t). In FIG. 3, a graph on the bottom is a graph showing time-dependent changes in the operation input $\tau_h$. FIG. 4 depicts a state of the first moment of inertia $J_{ref}$ being adjusted. In FIG. 4, a continuous line represents the first moment of inertia $J_{ref}$, and a dotted line represents the second moment of inertia $J_h$. It should be noted that $r_h$ (t) (the target angular velocity of the boom of the hydraulic excavator, the target angular velocity being held in the operator's brain) shown in FIG. 3 is a result given by substituting the above set values and the second moment of inertia $J_h$ (t) shown in formula (18) into formula (17) and carrying out a calculation.

It can be confirmed from FIG. 3 that the degree of comfort (system output) y (t) follows the target degree of comfort r (t) (=1). This can be confirmed also from a fact that the output angular velocity $y\omega$ (t) follows the target angular velocity $r_h$ (t). In this situation, the second moment of inertia $J_h$ (t) is changed by the operation input (lever input) $\tau_h$ (t). It can be understood from FIG. 4, however, that the first moment of inertia $J_{ref}(t)$ is properly estimated by database-driven control of the example so that the first moment of inertia $J_{ref}(t)$ follows the second moment of inertia $J_h$ (t). This implies that applying database-driven control of the example enables estimation of the second moment of inertia $J_h$ given by the operator.

The example and numerical value example described above demonstrate that in a case where the boom of the hydraulic excavator is an example of the target device 10 operated by the operator, the degree of comfort in operation of the boom of the hydraulic excavator is improved by performing one-parameter tuning of the first moment of inertia $J_{ref}$ by the control system focusing on controlling the first moment of inertia $J_{ref}$ on the assumption that the degree of comfort of the operator is based on the Weber-Fechner's law.

The embodiment (including the example) of the present invention has been described above. The present invention is not limited to the embodiment, and may be modified into various forms within the scope of the invention. In other words, the description of the embodiment is merely exemplary in nature, and is not intended to limit the present invention, its applications, or its use.

For example, in the above embodiment, the feedback control device 100 has been described for the case where the boom of the hydraulic excavator is the target device. The present invention, however, may also be applied to a different device that is at least rotationally operated by the operator.

In the above embodiment, one-parameter tuning of the first moment of inertia $J_{ref}$ is performed, with the viscosity coefficient D of formula (1) being set as a fixed value. Instead of performing this tuning, however, parameter tuning of the viscosity coefficient D as well as the first inertia moment $J_{ref}$ may be performed. The transfer function of the target device 10 is not limited to $(1/D)/(1+(J/D)\cdot s)$. If taking viscosity into consideration is unnecessary, for example, a transfer function not including the viscosity coefficient D may be used. When taking loss into consideration is necessary, a transfer function including a loss term may be used.

In the feedback control device 100, database-driven control by the target angular velocity determining unit 20 may be control using a learning function. In this case, as an operation time of the target device 10 operated by the operator gets longer, the target device 10 gradually changes in response behavior so as to make an output response more preferable to the operator. As a result, the degree of comfort y of the operator can be further improved. In particular, in a case where the database 50 makes progress in learning and is customized for individual operators, the first moment of inertia $J_{ref}$ may be adjusted based on the contents of the database 50, sensor input from the target device 10, and the like without using the degree of comfort y.

Summary of Embodiment

A feedback control device according to the embodiment includes: a target device that is at least rotationally operated by an operation input by an operator; a first target angular velocity determining unit that determines, based on the operation input, a first target angular velocity that is a target angular velocity of an output angular velocity of the target device, using a first transfer function that is a transfer function of the target device, the first transfer function being defined by a first moment of inertia representing a moment of inertia of the target device; a control unit that determines a control input to the target device, based on a difference between the first target angular velocity and the output angular velocity; a second target angular velocity determining unit that determines, based on the operation input, a second target angular velocity that is the target angular velocity requested by the operator, the target angular velocity corresponding to the operation input; a degree of comfort determining unit that determines a degree of comfort of the operator, based on a difference between the output angular velocity and the second target angular velocity; and a database that sequentially accumulates the first target angular velocity, the degree of comfort, and a target degree of comfort, in which the first target angular velocity determining unit adjusts the first moment of inertia in such a way as to reduce a difference between the first target degree of comfort and the degree of comfort, using the first target angular velocity, the degree of comfort, and the target degree of comfort that are accumulated in the database.

According to this configuration, the first target angular velocity that is the target angular velocity of the output angular velocity of the target device is determined based on the operation input to the target device. The control input to the target device is determined based on the difference between the first target angular velocity and the output angular velocity. The degree of comfort of the operator is determined based on the difference between the second target angular velocity that is the target angular velocity requested by the operator, the target angular velocity corresponding to the operation input, and the output angular velocity. The first moment of inertia is adjusted in such a way as to reduce the difference between the target degree of comfort and the degree of comfort. In this manner, the first target angular velocity is determined as the first moment of inertia included in the first transfer function is adjusted so that the degree of comfort of the operator is improved, and the control input is determined based on the difference between the first target angular velocity and the output angular velocity.

The degree of comfort is determined based on the difference between the second target angular velocity requested by the operator, second target angular velocity corresponding to the operation input, and the output angular velocity. The degree of comfort determining unit is thus able to determine the degree of comfort so that the degree of comfort takes the highest value when the operator has successfully carried out an operation that makes the target angular velocity of the target device, the target angular velocity being requested by the operator, equal to the actual target angular velocity of the target device. Hence the operator is able to operate the target device comfortably.

According to the feedback control device of this embodiment, only when the operation input is made, the first target angular velocity is determined, the control input to the target device is determined, and the target device is operated. This prevents a case where the target device starts moving automatically when the operator does not operate the target device, thus ensuring safety.

In the above feedback control device, the first transfer function has a viscosity coefficient, and when the first moment of inertia is $J_{ref}$ and the viscosity coefficient is D, the transfer function may be expressed as $(1/D)/(1+(J_{ref}/D) \cdot s)$.

According to this configuration, the rotational operation of the target device can be accurately feedback-controlled.

In the above feedback control device, the first target angular velocity determining unit may adjust the first moment of inertia, with the viscosity coefficient D set as a fixed value.

This reduces parameters to be adjusted to the first moment of inertia alone, thus allowing one-parameter tuning.

In the above feedback control device, the first target angular velocity determining unit may further determine the first target angular velocity while adjusting the viscosity coefficient D as a parameter.

According to this configuration, the rotational operation of the target device can be feedback-controlled more accurately.

In the above feedback control device, the target device may be a boom of a hydraulic excavator.

In this configuration, the operator is allowed to operate the boom of the hydraulic excavator comfortably and safely.

According to the above feedback control device, the second target angular velocity determining unit has a second transfer function that determines the second target angular velocity corresponding to the operation input, the second transfer function has a second moment of inertia representing a moment of inertia of the target device, the moment of inertia being requested by the operator, and the viscosity coefficient, when the second moment of inertia is $J_h$ and the viscosity coefficient is D, the second transfer function is expressed as $(1/D)/(1+(J_h/D) \cdot s)$, and the second moment of inertia $J_h$ has an adjusted value of the first moment of inertia $J_{ref}$.

According to this configuration, the second moment of inertia, which is unknown, can be determined using the first moment of inertia.

In the above feedback control device, the degree of comfort determining unit may set the degree of comfort larger as a difference between the output angular velocity and the second target angular velocity gets smaller.

According to this configuration, a large value of the degree of comfort can be set when the operator has successfully carried out an operation that makes the target angular velocity of the target device, the target angular velocity being requested by the operator, equal to the actual target angular velocity of the target device.

The invention claimed is:
1. A feedback control device comprising:
   a target device that is at least rotationally operated by an operation input by an operator;
   a first target angular velocity determining unit that determines, based on the operation input, a first target angular velocity that is a target angular velocity of an output angular velocity of the target device, using a first transfer function that is a transfer function of the target device, the first transfer function being defined by a first moment of inertia representing a moment of inertia of the target device;
   a control unit that determines a control input to the target device, based on a difference between the first target angular velocity and the output angular velocity;
   a second target angular velocity determining unit that determines, based on the operation input, a second target angular velocity that is the target angular velocity requested by the operator, the target angular velocity corresponding to the operation input;

a degree of comfort determining unit that determines a degree of comfort of the operator, based on a difference between the output angular velocity and the second target angular velocity; and a database that sequentially accumulates the first target angular velocity, the degree of comfort, and a target degree of comfort, wherein the first target angular velocity determining unit adjusts the first moment of inertia to reduce a difference between the target degree of comfort and the degree of comfort, using the first target angular velocity, the degree of comfort, and the target degree of comfort that are accumulated in the database.

2. The feedback control device according to claim 1, wherein the first transfer function is further defined by a viscosity coefficient, and when the first moment of inertia is Jref and the viscosity coefficient is D, the first transfer function is expressed as $(1/D)/(1+(Jref/D) \cdot s)$.

3. The feedback control device according to claim 2, wherein the first target angular velocity determining unit adjusts the first moment of inertia, with the viscosity coefficient D set as a fixed value.

4. The feedback control device according to claim 2, wherein the first target angular velocity determining unit further determines the first target angular velocity while adjusting the viscosity coefficient D as a parameter.

5. The feedback control device according to claim 2, wherein the second target angular velocity determining unit has a second transfer function that determines the second target angular velocity corresponding to the operation input, the second transfer function is defined by a second moment of inertia representing a moment of inertia of the target device, the moment of inertia being requested by the operator, and by the viscosity coefficient, when the second moment of inertia is Jh and the viscosity coefficient is D, the second transfer function is expressed as $(1/D)/(1+(Jh/D) \cdot s)$, and the second moment of inertia Jh has an adjusted value of the first moment of inertia Jref.

6. The feedback control device according to claim 1, wherein the target device is a boom of a hydraulic excavator.

7. The feedback control device according to claim 1, wherein the degree of comfort determining unit sets the degree of comfort larger as a difference between the output angular velocity and the second target angular velocity gets smaller.

* * * * *